United States Patent [19]
Banerjea et al.

[11] 4,150,840
[45] Apr. 24, 1979

[54] AUTOMATIC SUPPORTS

[75] Inventors: Tara N. Banerjea, Warren; Stephen J. Ringe, Detroit, both of Mich.

[73] Assignee: Fruehauf Corporation, Detroit, Mich.

[21] Appl. No.: 903,718

[22] Filed: May 8, 1978

[51] Int. Cl.² .............................................. B62D 53/08
[52] U.S. Cl. .................................................. 280/429
[58] Field of Search ............... 280/427, 428, 429, 430, 280/431, 434, 763, 764, 765, 766

[56] References Cited

U.S. PATENT DOCUMENTS

| | | | |
|---|---|---|---|
| 2,211,229 | 8/1940 | Fraser | 280/429 |
| 2,215,903 | 9/1940 | Edwards | 280/429 |
| 2,277,179 | 3/1942 | Winn | 280/420 |
| 2,418,240 | 4/1947 | Starr | 280/430 |
| 2,434,443 | 1/1948 | Starr | 280/430 |
| 2,471,555 | 5/1949 | Bennett | 280/431 |
| 2,572,240 | 8/1951 | Black | 280/429 |
| 2,710,201 | 7/1955 | Winn | 280/430 |
| 2,809,054 | 8/1957 | Miller | 280/429 |
| 2,809,247 | 8/1957 | Wintle | 200/67 DA |
| 3,089,711 | 5/1963 | Tantlinger | 280/150.5 |
| 3,101,202 | 8/1963 | Tantlinger | 280/30 |
| 3,163,306 | 12/1964 | Bennett | 214/515 |
| 3,251,610 | 5/1966 | Chosy | 280/435 |
| 3,253,839 | 5/1966 | Warren | 280/150.5 |
| 3,259,364 | 7/1966 | Hulverson | 254/86 |
| 3,456,962 | 7/1969 | Siveda | 280/430 |
| 3,525,538 | 8/1970 | Fujioka | 280/434 |
| 3,622,178 | 11/1971 | Tantlinger | 280/150.5 |
| 3,984,122 | 8/1976 | Bennett | 280/430 |

Primary Examiner—Joseph F. Peters, Jr.
Assistant Examiner—R. Schrecengost
Attorney, Agent, or Firm—Harness, Dickey & Pierce

[57] ABSTRACT

A trailer having a front undercarriage assembly including lower members or "feet" that are adapted to automatically retract when the trailer is coupled to a tractor. Direct mechanical linkages are provided throughout the retracting mechanism to insure positive operation of the apparatus. In addition, a novel latching mechanism is disclosed that is adapted to automatically lock the vehicles in the coupled position and permit convenient disengagement of the trailer from the tractor.

10 Claims, 8 Drawing Figures

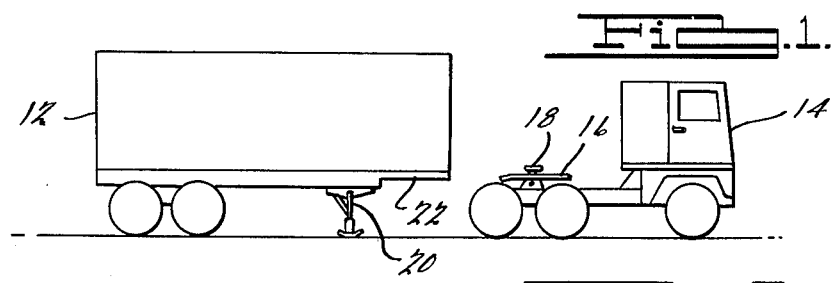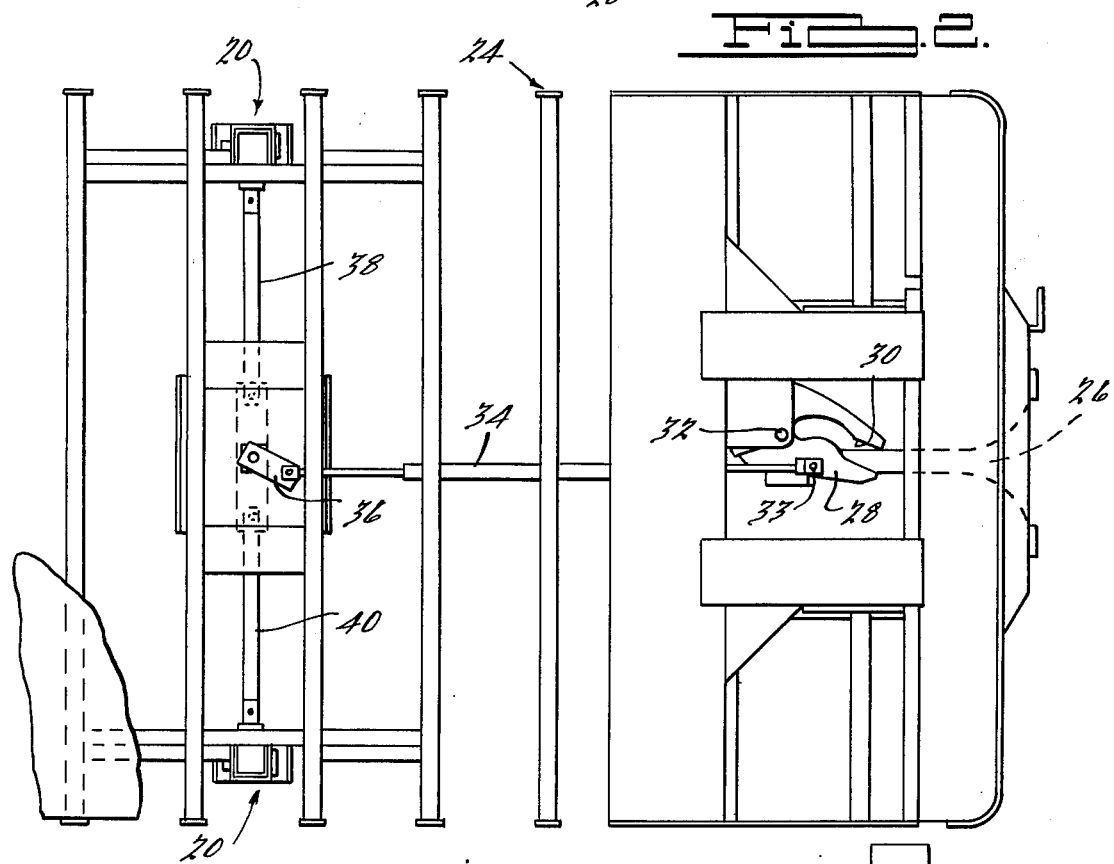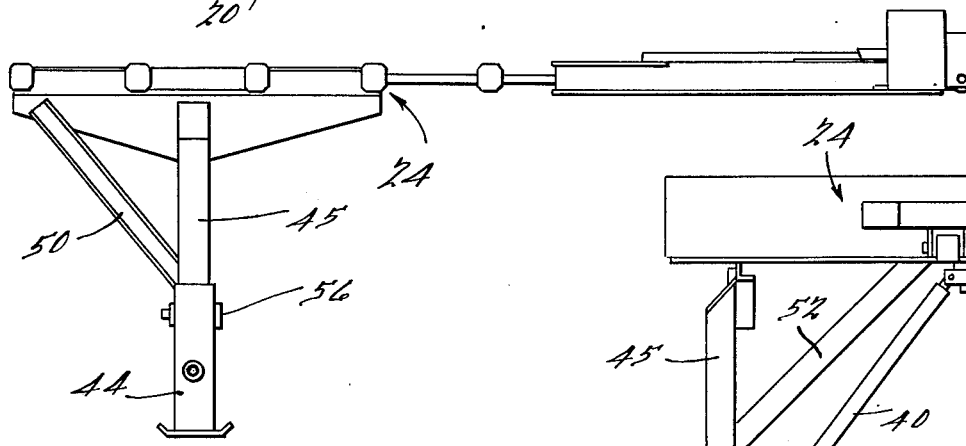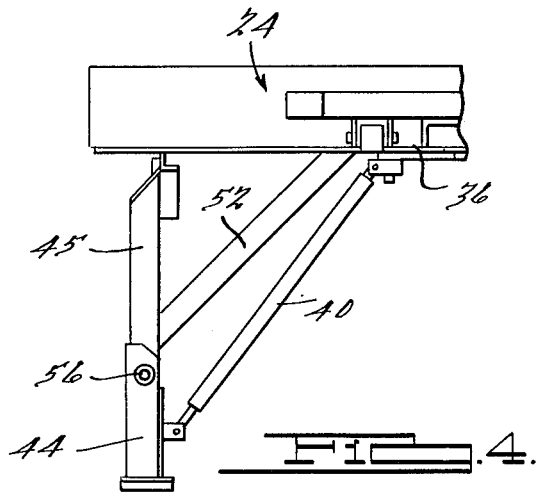

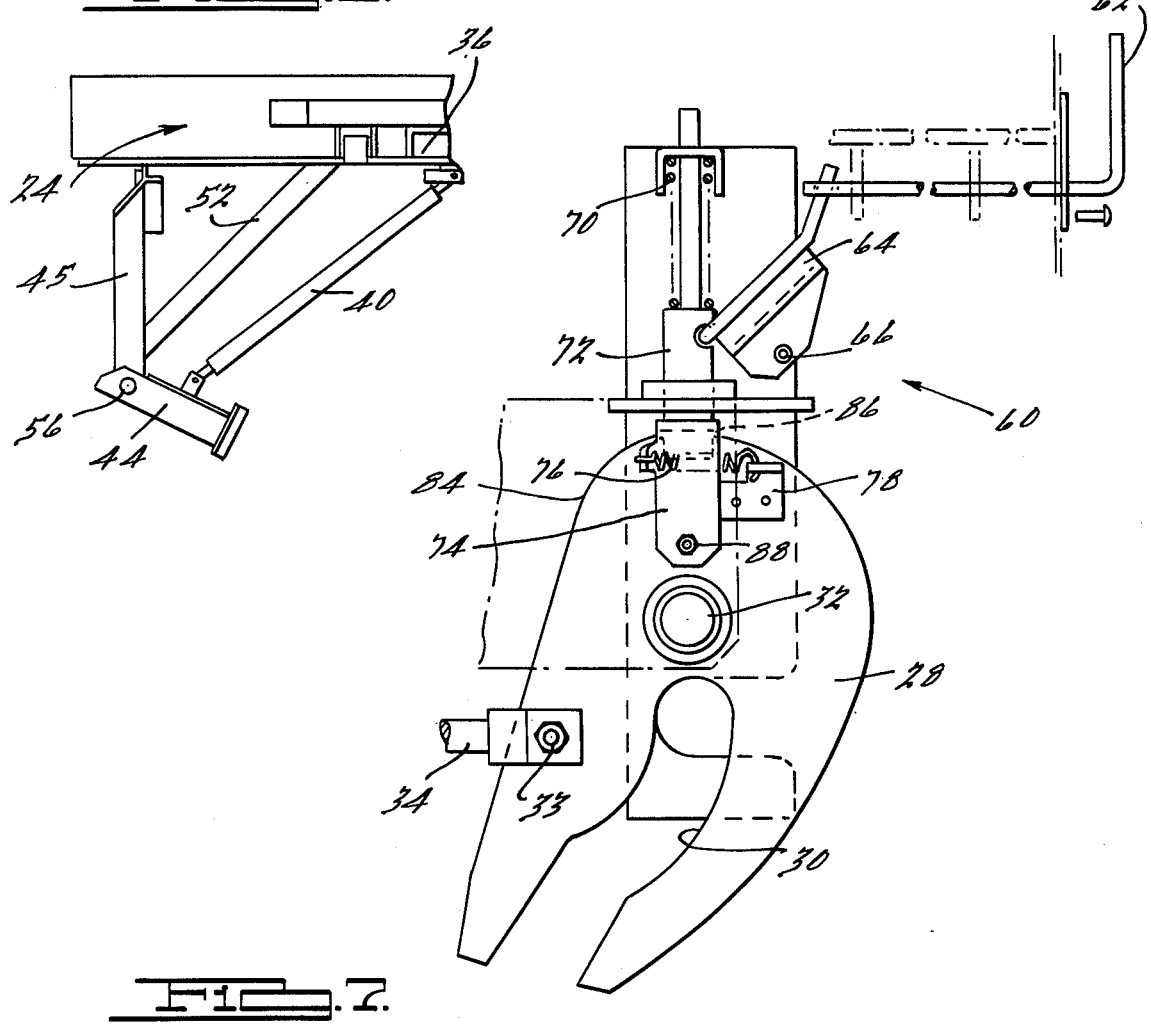
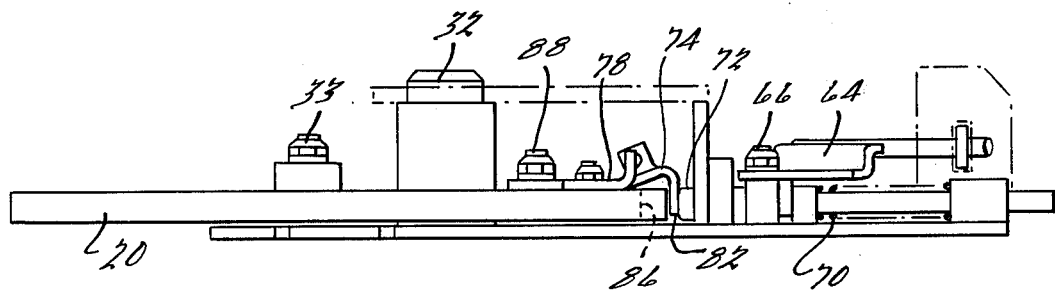

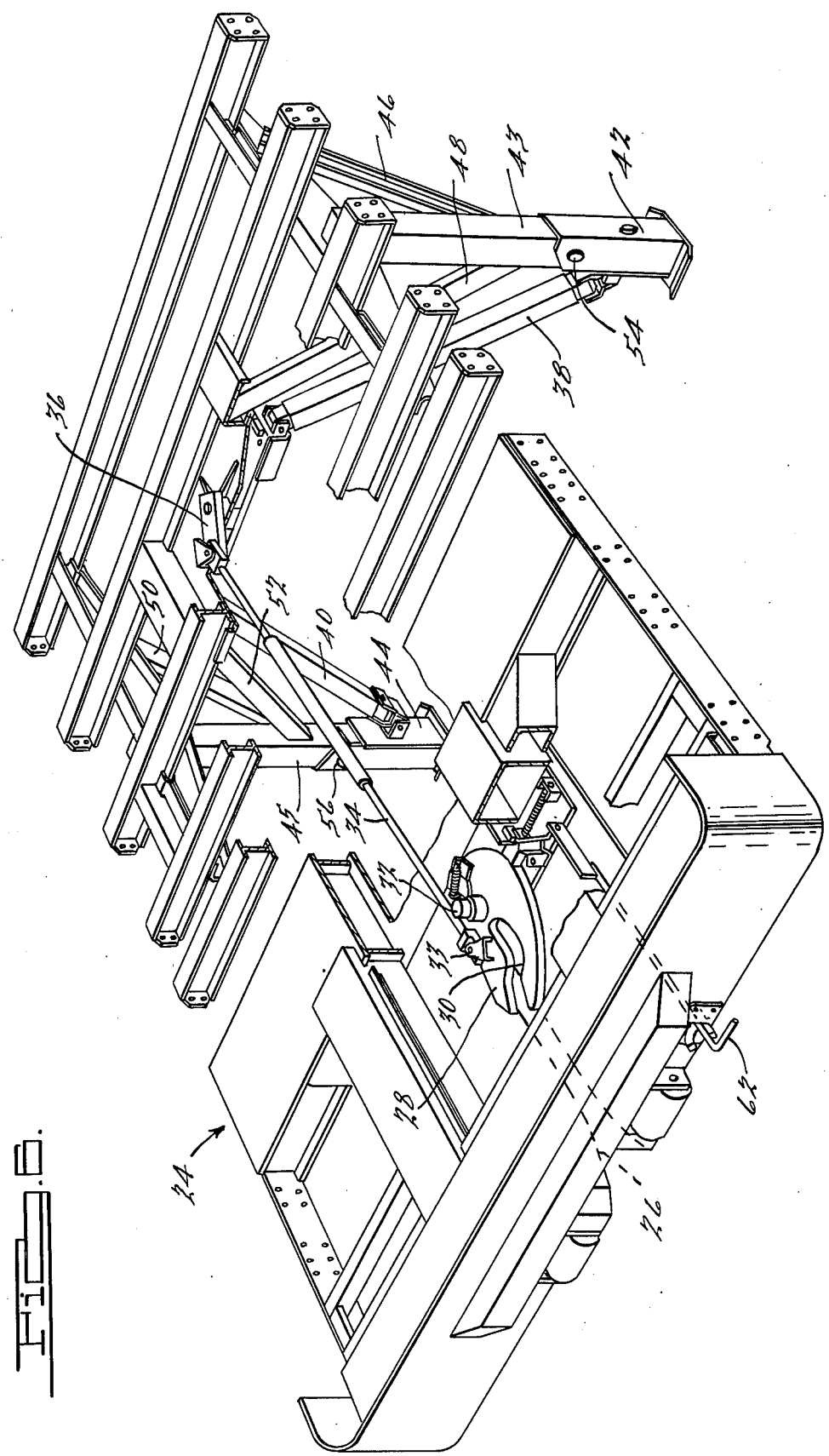

AUTOMATIC SUPPORTS

BACKGROUND AND SUMMARY OF THE INVENTION

The present invention relates to a novel trailer structure and in particular to a trailer having means for automatically retracting the lower portion of the front undercarriage of the trailer when the trailer is coupled to a tractor.

Conventional trailer designs typically include an upper fifth wheel located at the forward end of the trailer that is adapted to be supported by the lower fifth wheel of a tractor when the trailer is coupled to the tractor. When uncoupled from the tractor, the forward end of the trailer is supported by a front undercarriage, commonly referred to as landing gear, which is adapted to be raised or retracted in some manner when the trailer is coupled to the tractor for service.

Several designs have been proposed to automatically retract the landing gear of a trailer as the tractor is backed up and coupled to the trailer. However, such designs have generally sought to retract the entire landing gear assembly, which typically requires relatively costly and in some cases fairly complex mechanisms. This is due primarily to the increased structural integrity required of the components in the operating mechanism as well as the resulting additional complexity in the entire retractable undercarriage assembly.

The present invention seeks to minimize the expense and complexity of automatic retractable landing gear assemblies by providing a trailer designs having an undercarriage comprised of fixed support legs with pivotal lower "feet" members that are adapted to be automatically retracted when the trailer is coupled to a tractor. By retracting only the lower portion of the front undercarriage supports, the fixed upper support struts can be rigidly secured to the bed of the trailer in a substantially less expensive manner than if the entire undercarriage assembly were designed to be retractable. In addition, the relative simplicity of the design greatly improves long term reliability of the system which in the past has proven to be a significant problem in view of the harsh environment to which the undercarriage of the trailer is exposed.

In general, the automatic retracting mechanism of the present invention includes a rotatable cam plate member that is adapted to be actuated by the kingpin on the fifth wheel of the tractor. In particular, as the tractor is backed up to the trailer, the kingpin is guided along a slot located at the front end of the trailer and into the "jaw" of the cam plate member. The rearward movement of the kingpin actuates the cam plate causing it to rotate about its pivot point. The rotation of the cam plate is translated into a fore or aft movement of a longitudinal rod that is affixed at one end to the cam plate and at its other end to a pair of transverse supporting links connected to the feet of the undercarriage assembly. Aft movement of the longitudinal connecting rod serves to draw the transverse links inwardly with respect to the sides of the trailer, thereby folding the feet of the undercarriage assembly inwardly to their retracted transport position. In addition, a latching mechanism is provided that is adapted to automatically lock the kingpin of the tractor to the cam plate of the trailer when the tractor is completely coupled to the trailer.

To uncouple the tractor from the trailer, a manually actuated unlatching mechanism is provided at the front of the trailer that is adapted to unlock the kingpin from the cam plate and hold the latching mechanism in the unlocked condition to permit the tractor to be disengaged from the trailer. As the tractor is driven away from the trailer, the forward movement of the kingpin causes the cam plate to rotate back to its original position, which in turn causes forward movement of the longitudinal connecting rod which actuates the transverse links to lower the feet of the front undercarriage.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is a view of a conventional tractor and trailer to which the present invention pertains;

FIG. 2 is a plan view of the bed of the trailer embodying an automatic support mechanism according to the present invention;

FIG. 3 is a side view of the frame of the trailer assembly shown in FIG. 2;

FIG. 4 is a detailed view of one side of the front undercarriage of the trailer;

FIG. 5 is a view of the undercarriage assembly illustrated in FIG. 4 showing the foot portion of the support leg being retracted;

FIG. 6 is a perspective view of the front portion of the trailer frame shown in FIG. 2;

FIG. 7 is a detailed view of the automatic latching mechanism according to the present invention; and FIG. 8 is a side view of the latching mechanism shown in FIG. 7.

DETAILED DESCRIPTION OF THE PREFERRED EMBODIMENT

Referring to FIG. 1, a conventional tractor 14 and a trailer 12 to which the present invention pertains is shown. The tractor 14 includes what is commonly referred to as a lower fifth wheel 16 that is adapted to support an upper fifth wheel 22 located on the underside of the front of the trailer 12. Protruding from a central position on the lower fifth wheel 16 of the tractor 14 is a kingpin 18 that is provided to insure proper coupling between the lower fifth wheel 16 and the upper fifth wheel 22 of the trailer 12.

When disengaged from the tractor 14, the front half of the trailer 12 is supported by an undercarriage assembly 20 commonly referred to as "landing gear." When coupled to the tractor 14 for service, the lower portion of the landing gear 20 of the present invention is adapted to automatically retract in a manner to be subsequently described. At the outset, it will be noted that, when supported by the front undercarriage assembly 20, the upper fifth wheel 22 of the trailer 12 is disposed slightly lower than the lower fifth wheel 16 of the tractor 14. In this manner, when the tractor 12 is backed into the trailer 12, the upper fifth wheel 22 of the trailer 12 will ride up onto the lower fifth wheel 16 of the tractor 14, thereby taking the load off the front undercarriage 20 of the trailer 12 to permit the landing gear 20 to be retracted.

Looking now to FIGS. 2 and 6, an exposed view of the front half of the frame 24 of a trailer 12 according to the present invention is shown. The front of the trailer frame 24 has formed therein a longitudinal slot 26 that is adapted to receive the kingpin 18 of the tractor 14 as the tractor is backed into the trailer 12. The longitudinal slot 26 serves to guide the kingpin 18 into the jaw 30 of a cam plate 28 that is rotatably secured to the frame 24 of the trailer 12 by a journal pin 32. Affixed to the cam plate 28 by a coupling 33 is a longitudinal connecting rod 34 that extends aft from the cam plate 28 to a point in the center of the frame 24 relative to the sides of the trailer 12 above the front undercarriage assembly 20 of the trailer 12. The rearward end of the connecting rod 34 is operatively connected by a coupling mechanism 36 to a pair of rigid transverse links 38 and 40 which extend downward diagonally from the coupling mechanism 36 to the lower segments 42 and 44 or "feet" of the support struts, 43 and 45 respectively.

As best shown in FIG. 6, the upper portion of support strut 43, referred to as a support "leg," is rigidly secured to the frame 24 of the trailer 12 by a pair of diagonal bracing members 46 and 48. Similarly, the upper portion of support strut 45 is rigidly secured to the frame 24 of the trailer 12 by diagonal bracing members 50 and 52. As will be appreciated by those skilled in the art, since the support legs 43 and 45 of the undercarriage 20 of the present invention are not intended to be retractable, the support struts can be simply and rigidly secured to the frame 24 of the trailer. This greatly facilitates the strength of the strut members 43 and 45 and improves the overall integrity of the front undercarriage assembly 20. The lower portion or foot 42 of support strut 43 is pivotally secured to the strut so that it can pivot inwardly from its extended position illustrated in FIG. 6 about joint 54. Similarly, foot 44 is pivotally fastened to strut 45 so that it can pivot inwardly about joint 56.

Referring additionally to FIGS. 3–5, the manner in which the feet 42 and 44 are automatically retracted when the trailer 12 is coupled to the tractor 14 will now be described. As the tractor 14 is backed into the trailer 12, the kingpin 18 of the tractor 14 is guided along the slot 26 until it engages the jaw 30 of the cam plate 28. At this point, it will be recalled that due to the height relationship between the lower fifth wheel 16 on the tractor 14 and the upper fifth wheel on the trailer 12, the front end of the trailer 12 will be raised slightly thus taking the load off the front undercarriage assembly 20. As the tractor 14 continues to move rearwardly, kingpin 18 rotates cam plate 28 clockwise relative to FIG. 6 about journal pin 32. The clockwise rotation of cam plate 28 is translated into rearward movement of longitudinal connecting rod 34, which in turn actuates the coupling mechanism 36, thereby drawing the transverse links 38 and 40 inwardly toward the center of the trailer. As the transverse links 38 and 40 move inwardly with respect to the sides of the trailer 12, the lower feet 42 and 44 of support struts, 43 and 45 respectively, are pivoted inwardly about joints 54 and 56.

The retraction of feet 42 and 44 is probably best shown in FIGS. 4 and 5 which represents a sequential illustration of the operation of the left half of the undercarriage assembly. In FIG. 4, it can be seen that foot 44 is in its fully extended position aligned with support strut 45. However, in FIG. 5 transverse link 40 has been drawn toward the center of the trailer by coupling mechanism 36 causing foot 44 to pivot about joint 56 to its retracted position.

To insure that the trailer 12 remains coupled to the tractor 14, an automatic latching mechanism 60 is provided that is adapted to lock the cam plate 28 in position when it reaches its maximum point of clockwise rotation. With particular reference to FIG. 7, a detailed view of the cam plate 28 and the latching mechanism 60 is shown. Latching mechanism 60 includes a locking pin 72 that is mounted radially relative to cam plate 28 and biased toward cam plate 28 by a lock spring 70. As the cam plate 28 is rotated clockwise by the rearward movement of the kingpin of the tractor, lock pin 72 is adapted to ride along the camming surface 84 on the side of cam plate 28 until the lock pin 72 is aligned with a slot 86 formed in the cam plate 28. At this point the lock pin 72 is urged into the slot 86 in cam plate 28 by lock spring 70, thereby preventing further rotation of the cam plate 28 and hence withdrawal of the kingpin 18 of the tractor 14. Additionally, it will be noted that as the cam plate 28 rotates clockwise the final few degrees to its locked position, the lock pin 72 will contact the depending tab 82 of a lock-out member 74 pivotally secured at point 88 to cam plate 28, causing the lock-out 74 to pivot counterclockwise away from slot 86 against the bias of a spring 76 which is secured between lock-out 74 and a stop 78. The purpose of the lock-out 74 will be subsequently described.

In order to uncouple the trailer 12 from the tractor 14, it is necessary to unlock the automatic latching mechanism 60. This is accomplished simply by pulling on the handle 62 which protrudes from the front of the trailer 12, as best illustrated in FIG. 6. The handle 62 is connected directly to a linkage 64 that is adapted to pivot about point 66 as the handle 62 is pulled outwardly. Due to the direct coupling between linkage 64 and lock pin 72, the clockwise rotation of linkage 64 serves to draw the lock pin 72 out of the slot 86 in the cam plate 28 against the bias of lock spring 70. As the lock pin 72 is retracted past the tab 82 of lock-out 74, the spring 76 will cause the lock-out 74 to snap back against stop 78 so that the depending tab 82 of lock-out 74 covers the slot 86 in cam plate 28. In this manner, when the handle 62 is released, the lock-out 74 prevents the lock pin 72 from relatching the cam plate 28.

With the latching mechanism 60 unlocked, the cam plate 28 is again free to rotate, thereby releasing the kingpin 18 of the tractor. The tractor 14 is then free to be disengaged from the trailer 12 simply by applying the trailer brakes and driving the tractor 14 forward; the forward movement of the kingpin 18 will cause the cam plate 28 to rotate counterclockwise from the position illustrated in FIG. 7 to the position illustrated in FIG. 6. The rotational movement of cam plate 28 is translated into forward movement of the longitudinal connecting rod 34 which in turn actuates the coupling mechanism 36 causing the transverse links 38 and 40 to be moved outwardly with respect to the sides of the trailer 12. The outward movement of the transverse links 38 and 40 pivots the feet 42 and 44 of support struts 43 and 45 downwardly into alignment with the legs of struts 43 and 45 as shown in FIG. 6. It will be noted, that as the tractor 14 is driven away from the trailer 12, the kingpin 18 will cause the cam plate 28 to rotate to its original position before the lower fifth wheel 16 of the tractor completely disengages from the upper fifth wheel 22 of the trailer 12. In this manner, the feet 42 and 44 of the undercarriage are automatically extended to the support position before the front end of the trailer 12 is lowered onto the landing gear 20.

While the above description constitutes the preferred embodiment of the invention, it will be appreciated that the invention is susceptible to modification, variation and change without departing from the proper scope or fair meaning of the accompanying claims.

What is claimed is:

1. A trailer having an upper fifth wheel that is adapted to be coupled to a tractor having a lower fifth wheel, and a kingpin protruding upwardly from said lower fifth wheel, an automatically retractable front undercarriage assembly comprising:
   a pair of front support struts having upper and lower members thereof, the upper members being rigidly secured to the frame of said trailer and the lower members thereof being pivotally secured to said upper members such that in the extended position said lower members are aligned with said upper members to support the front end of said trailer, and in the retracted position said lower members are pivoted inwardly with respect to the sides of said trailer;
   camming means having a slotted opening therein for receipt of said kingpin as said tractor is backed up to couple with said trailer, the rearward movement of said kingpin causing said camming means to rotate in a first direction about an axis;
   a longitudinal rod connected at one end to said camming means such that the rotation of said camming means is translated into fore or aft movement of said longitudinal rod;
   a pair of transverse links each connected at one end to one of said lower members of said support struts; and
   coupling means connected to the other ends of said pair of transverse links and to the other end of said longitudinal rod for drawing said transverse links inwardly with respect to the sides of said trailer when actuated by the movement of said longitudinal rod so that said lower members of said support struts are pivoted from said extended position to said retracted position.

2. The trailer of claim 1 wherein said lower fifth wheel is disposed slightly higher than said upper fifth wheel when the front end of said trailer is supported by said front support struts and said camming means is disposed sufficiently aft of the front end of said trailer so that when the tractor is backed into the trailer said upper fifth wheel will ride up onto said lower fifth wheel thereby taking the load off said front support struts before said kingpin engages said camming means.

3. The trailer of claim 2 wherein forward movement of said tractor relative to said trailer to disengage the trailer from the tractor causes rotation of said camming means in the direction opposite said first direction, which is translated into fore or aft movement of said longitudinal rod, thereby actuating said coupling means to move said transverse links outwardly relative to the sides of said trailer causing said lower members of said support struts to pivot from said retracted position to said extended position.

4. The trailer of claim 3 wherein said transverse links comprise rigid metal bars.

5. The trailer of claim 3 further including latching means for automatically locking said camming means when said tractor has been coupled to said trailer.

6. The trailer of claim 5 wherein said latching means includes a lock disposed at the periphery of rotation of said camming means that is biased toward the axis of rotation of said camming means and is adapted to engage a slot formed in said camming means when said camming means has rotated to its extent of travel in said first direction.

7. The trailer of claim 6 wherein said slot is formed in the side surface of said camming means and said lock is adapted to ride against said side surface as said camming means is rotated until said lock engages said slot.

8. The trailer of claim 7 wherein said latching means further includes means for unlocking said camming means from said lock so that said tractor can be disengaged from said trailer comprising manually operable means for withdrawing said lock from the slot in said camming means and lock-out means biased to cover said slot when not occupied by said lock.

9. The trailer of claim 8 wherein said lock-out means comprises a lock-out member having a depending tab that is pivotally fastened to said camming means and biased so that said depending tab normally covers said slot.

10. The trailer of claim 9 wherein said lock is adapted to pivot said lock-out member away from said slot as said camming means is rotated to its extent of travel in said first direction, thus permitting said lock to engage said slot.

* * * * *